May 17, 1927.

E. K. GIFFEN

PROCESS AND APPARATUS FOR RECOVERING SILVER FROM PHOTOGRAPHERS' SPENT HYPOSULPHITE SOLUTION

Filed Sept. 19, 1925

1,629,212

WITNESSES
W. A. Williams
Harry E. Seidel

INVENTOR
E. K. Giffen
BY
Munn & Co.
ATTORNEYS

Patented May 17, 1927.

1,629,212

UNITED STATES PATENT OFFICE.

ERNEST K. GIFFEN, OF SALIDA, COLORADO.

PROCESS AND APPARATUS FOR RECOVERING SILVER FROM PHOTOGRAPHER'S SPENT HYPOSULPHITE SOLUTION.

Application filed September 19, 1925. Serial No. 57,455.

This invention relates to a process and apparatus for recovering silver from the more or less exhausted photographers' solutions commonly known as hypo-sulphite of soda.

An object of the invention is the provision of a device in which the exhausted photographers' solutions of hypo-sulphite of soda are placed with a special equipment of positive and electric plates disposed in the solution which in the present case forms electrolyte whereby the silver will be deposited upon the positive electrode without any possibility of the silver being acted upon by hydrogen sulphide which is formed when the hypo-sulphite solution acts on the positive element, since the gas, after formation, is directed away from the solution.

Another object of the invention is the provision of a device for recovering silver from exhausted photographer's solution of hypo-sulphite of soda and in which the sulphite solution is used as an electrolyte and a pair of elements representing positive and negative are so placed in the electrolyte to produce a current and recover the silver on the positive element that the silver when separated will not be affected by hydrogen sulphide gas since the hydrogen sulphide developed in the electrolyte by the breaking down of the hypo-sulphite of soda is prevented from coming into contact with the solution and consequently with the silver in order to prevent the formation of sulphide of silver.

A further object of the invention is the provision of a cell in which the electrolyte is formed from the exhausted photographer's solution of hypo-sulphite of soda so that when the circuit is closed the silver will be liberated and be deposited on the positive element of the battery, a resistance being employed in the circuit for aiding in maintaining the voltage constant until all the silver is deposited so that a chemical action is prevented in the liquid which normally causes the production of hydrogen sulphide gas with the consequent precipitation of sulphide of silver.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

Figure 1:
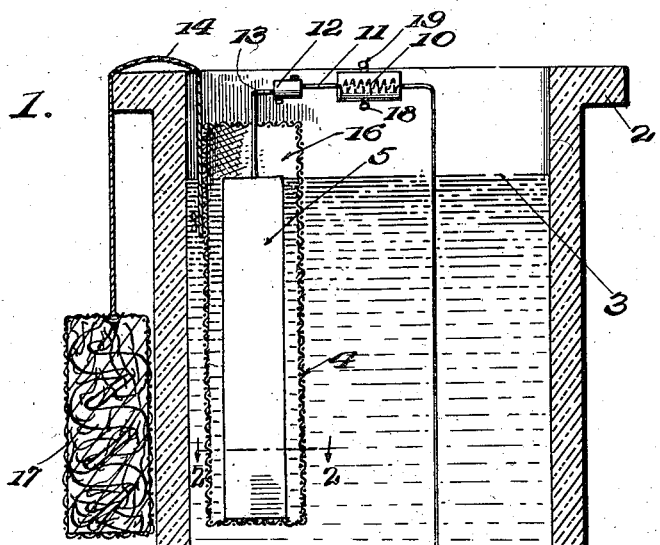
Figure 1 represents more or less diagrammatically a vertical section of a device for carrying out my process for the recovery of silver from exhausted hypo-sulphite solutions.
Figure 2:
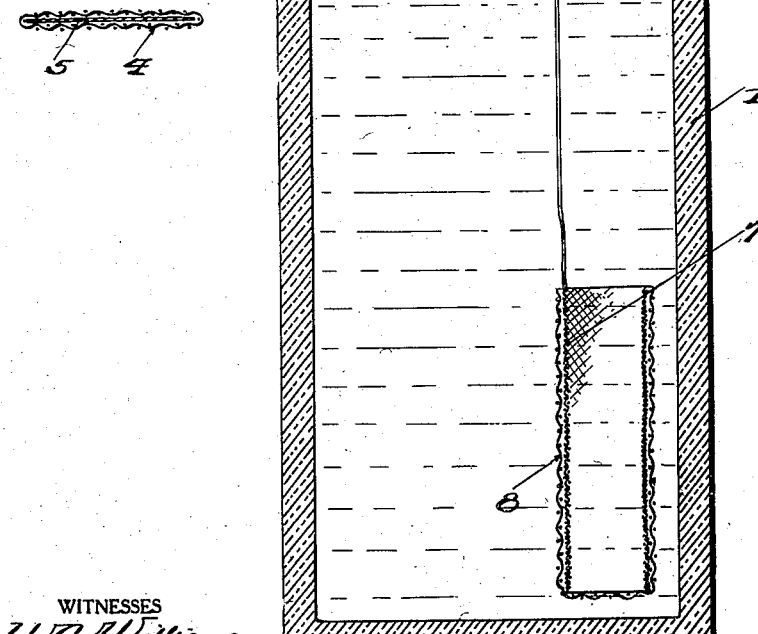
Figure 2 is a transverse section of the bag taken along the line 2—2 of Figure 1.

Referring more particularly to the drawings, 1 designates a casing which may be made of glass or some other material not affected by acids and which has an upper flanged portion 2 forming a bead and projecting laterally from the upper end of said container. Any convenient vessel such as an extra fixing tank or barrel may be employed by the photographer for the casing 1. The container is adapted to be filled with the more or less exhausted solution of hypo-sulphite of soda to the level indicated by the numeral 3 and into which is inserted at its upper end a porous bag 4 which may be of canvas or any other material suitable for the purpose. An element 5 formed of a zinc plate is inserted within the bag and forms the negative pole of the battery. The zinc plate is of such a size as to approximately fill the bag.

The positive element 7 is located at the bottom of the container 1 and is in the shape of a copper screen surrounded by a second fiber netting 8 such as ¼-inch fish netting, for the support of the copper screen and the silver that collects thereon. The netting 8 completely encloses the element 7.

An insulated wire 9 connects the positive element 7 with one end of a resistance 10, the other end of the resistance being connected by a wire 11 to a plug 12. An insulated wire 13 connects the negative electrode 5 with the plug 12. Said plug is adapted to form a connection for closing the circuit between the negative element 5 and the positive element 7 so that a current will pass therethrough and cause disintegration of the hypo-sulphite solution in the container 1 which acts upon the zinc 6 in the bag or casing 4. The current, it will be seen, passes in the liquid from the negative element 5 to the positive element 7 and out of the liquid through the connecting wire 9 from the positive element to the negative element 5. The zinc being the active element thus forms the negative pole of the battery.

A cord or rope 14 is connected to the bag 4 and bent around the flanged upper end 2 of the container 1 and a weight 17 suspended by the rope outside of the container is adapted to maintain the bag adjacent the top of the container so that an air space 16 is provided above the level 3 of the liquid and the top of said bag.

In the operation of my device the container 1 is filled to the level indicated at 3 with the hypo-sulphite solution and the bag 4 is likewise filled to the point indicated by the level of the liquid in the container 1. The action of the hypo-sulphite solution on the zinc in the bag initiates the action of the battery for the recovery of the silver from the whole solution. A woven copper element 7 is, in a short period of time, covered with a thin silver coating providing a silver element. The silver from the exhausted hypo solution in the bag being replaced by the zinc forming probably a zinc hypo-sulphite or other zinc salts. Thus it will be seen that the essentials of a Voltaic cell are provided, that is a silver electrode surrounded by a silver salt, and a zinc electrode surrounded by a zinc salt or salts, and the two separated by a porous partition or canvas bag and the whole space between the elements 5 and 7 being occupied by a concentrated solution of sodium hypo-sulphite which has not been saturated with the silver, whereby the internal resistance of the Voltaic cell is reduced. An electric current is thus set up between the negative element 5 and the positive element 7. The zinc ions go into solution and force the positive silver ions onto the copper screen 7. This action is maintained until the silver is exhausted from the solution and deposited as metallic silver on the screen 7 provided, however, that the external circuit passes through a suitable resistance such as 10 and which resistance must be at least such that the Voltaic cell may maintain approximately its full voltage until all the silver is deposited on the copper screen 7. The resistance is absolutely essential since without it a chemical action would take place which would cause hydrogen sulphide gas to be formed and which would cause the precipitation of silver sulphide so that the silver coated copper screen 7 would become black and prevent the continuous deposit of the silver from the solution.

Furthermore it must be borne in mind that unless the zinc element 5 was enclosed within the porous bag 4 silver would not be deposited on the screen 7 for any length of time because of the fact that the bag provides a means for preventing the hydrogen sulphide from entering the solution in the container 1 and attacking the silver in solution.

What I claim is:

1. A device for recovering metallic silver from photographer's spent hypo-sulphite solution comprising a container adapted to be partially filled with a hypo-suphite solution, a porous bag supported in the container to a predetermined depth in the solution, metal in the bag forming a negative element of a voltaic cell, a positive element placed in the solution remote from the negative element, an insulated external connection between the positive element and the negative element in the bag, and a resistance interposed in the wire.

2. A device for recovering metallic silver from photographer's spent hypo-sulphite solution comprising a container adapted to be partially filled with a hypo-sulphite solution, a porous bag supported in the container to a predetermined depth in the solution, a metal in the bag forming a negative element of a voltaic cell, a positive element having a large metallic collecting surface placed in the solution, an insulated wire connecting the positive element with the negative element in the bag, and a resistance interposed in the wire.

3. A device for recovering metallic silver from photographer's spent hypo-sulphite solution and comprising a container adapted to be partially filled with a hypo-sulphite solution, a porous bag supported in the container to a predetermined depth in the solution so that a portion of the bag will be maintained above the level of the liquid, a metal in the bag forming a negative element of a voltaic cell, a positive element placed in the solution remote from the negative element, an insulated external connection between the positive element and the negative element having a predetermined ohmic resistance, said positive element comprising a copper screen, and a fiber netting surrounding said screen.

4. A device for recovering metallic silver from photographer's spent hypo-sulphite solution comprising a container adapted to be partially filled with a hypo-sulphite solution, a porous bag supported in the container to a predetermined depth in the solution so that a portion of the bag will be maintained above the level of the liquid, means for adjustably supporting the bag in said solution, a metal in the bag forming a negative element of a voltaic cell, a positive element placed in the solution adjacent the bottom of container, an insulated wire connecting the positive element with the negative element in the bag, and a predetermined ohmic resistance interposed in the wire.

5. A process for the recovery of silver from spent hypo-sulphite solutions which comprises immersing elements in remote relation in the solution to form a voltaic cell and connecting said elements externally through an ohmic resistance which will maintain the maximum voltage between said elements during deposition of silver upon one of said elements.

ERNEST K. GIFFEN.